United States Patent
Arora et al.

(10) Patent No.: US 11,562,335 B2
(45) Date of Patent: Jan. 24, 2023

(54) METHOD AND SYSTEM FOR FACILITATING ATM TRANSACTIONS USING BLOCKCHAIN

(71) Applicant: Mastercard International Incorporated, Purchase, NY (US)

(72) Inventors: Ankur Arora, New Delhi (IN); Jaipal Singh Kumawat, Rajasthan (IN); Aditya Koduri, Haryana (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 176 days.

(21) Appl. No.: 15/882,277

(22) Filed: Jan. 29, 2018

(65) Prior Publication Data
US 2019/0236571 A1 Aug. 1, 2019

(51) Int. Cl.
*G06Q 20/10* (2012.01)
*G06Q 20/06* (2012.01)
(Continued)

(52) U.S. Cl.
CPC ....... *G06Q 20/1085* (2013.01); *G06Q 20/065* (2013.01); *G06Q 20/3829* (2013.01);
(Continued)

(58) Field of Classification Search
CPC ............ G06Q 20/38; G06Q 20/38215; G06Q 20/3829; G06Q 20/1085; G06Q 20/065;
(Continued)

(56) References Cited

U.S. PATENT DOCUMENTS

| | | | |
|---|---|---|---|
| 2003/0126439 A1* | 7/2003 | Wheeler | H04L 63/083 |
| | | | 713/168 |
| 2017/0178128 A1* | 6/2017 | Fourez | G06Q 20/38 |

(Continued)

FOREIGN PATENT DOCUMENTS

| | | | | |
|---|---|---|---|---|
| CN | 105684008 A | | 6/2016 | |
| GB | 2467530 A | * | 8/2010 | ............. G06Q 20/10 |

OTHER PUBLICATIONS

Rajendran et al., "Secure and Privacy Preserving Digital Payment", ©2017, IEEE.org (Year: 2017).*

(Continued)

*Primary Examiner* — Thien T Mai
(74) *Attorney, Agent, or Firm* — Panitch Schwarze Belisario & Nadel LLP

(57) ABSTRACT

A method for on-behalf ATM processing via blockchain includes: receiving, by a receiver of an automated teller machine (ATM), a transaction identifier; receiving, by an input device interfaced with the ATM, a withdrawal amount; identifying, by the ATM, a blockchain transaction in one of a plurality of blocks comprising a blockchain, wherein the blockchain transaction includes at least the transaction identifier and a current balance; and processing, by the ATM, withdrawal of the withdrawal amount based on the current balance, where processing includes dispensing, by a dispenser interfaced with the ATM, currency equivalent to the withdrawal amount if the withdrawal amount is less than or equal to the current balance or displaying, by a display (Continued)

device interfaced with the ATM, a message indicating an insufficient balance if the withdrawal amount is greater than the current balance.

14 Claims, 5 Drawing Sheets

(51) Int. Cl.
    *G07F 19/00*       (2006.01)
    *H04L 9/06*        (2006.01)
    *H04L 67/1042*     (2022.01)
    *G06Q 20/38*      (2012.01)

(52) U.S. Cl.
    CPC .......... *G07F 19/203* (2013.01); *G07F 19/206* (2013.01); *H04L 9/0637* (2013.01); *H04L 67/1042* (2013.01)

(58) Field of Classification Search
    CPC .. G06Q 20/3278; G06Q 20/367; G06Q 20/10; G06Q 20/3674; G06Q 20/3221; G06Q 30/0237; G06Q 20/04; G06Q 20/405; G06Q 20/40; G06Q 20/3223; G06Q 20/32; G06F 16/2455; G06F 16/22; G06F 17/11; G06F 21/31; G06F 21/42; G06F 21/45; H04L 63/0823; H04L 63/0838; H04L 63/10; H04L 63/0846; H04L 63/18; H04L 63/20; H04L 9/0637; H04L 67/1042; H04L 9/50; H04L 2209/56; H04L 63/061; G07F 17/3225; G07F 19/203; G07F 19/20; G07F 19/206; G07F 7/0866; G07F 17/3251
See application file for complete search history.

(56) References Cited

U.S. PATENT DOCUMENTS

2019/0036913 A1*  1/2019  Tzur-David ............ G06F 17/11
2019/0037401 A1*  1/2019  Egner ................ G06Q 20/4016
2019/0052453 A1*  2/2019  de Ligt ................ H04L 9/0637
2019/0052467 A1*  2/2019  Bettger ................ G06F 21/602

OTHER PUBLICATIONS

Peter Mitic, "Trends in Banking 2017 and onwards", 2017, arXiv.org (Year: 2017).*

Notification of Transmittal of the International Search Report and the Written Opinion of the International Searching Authority (Forms PCT/ISA/220, PCT/ISA/210 and PCT/ISA/237) dated Mar. 1, 2019, by the European Patent Office in corresponding International Application No. PCT/US2018/063186. (11 pages).

Notification of the First Office Action dated Sep. 27, 2022 in CN Application No. 201910024918.2, issued by the China National Intellectual Property Administration.

* cited by examiner

METHOD AND SYSTEM FOR FACILITATING ATM TRANSACTIONS USING BLOCKCHAIN

FIELD

The present disclosure relates to the facilitation of automated teller machine (ATM) transactions using a blockchain, specifically enabling an ATM to perform authorizations and determinations on behalf of an issuing institution for a supplied payment instrument using a blockchain.

BACKGROUND

Automated teller machines (ATMs) provide a number of conveniences to users that may be otherwise difficult or time consuming. Most commonly, ATMs are used for making balance inquiries or withdrawing cash from a transaction account that is associated with a payment instrument supplied to the ATM, such as a check, debit card, or credit card. In many cases, banks and other issuing institutions will have ATMs placed in strategic locations where their customers are able to access these functions associated with their transaction account(s) issued by that same institution. However, to help service their customers in additional areas, issuing institutions often enable their customers to access ATMs managed by other institutions or service providers, often at a fee, where the other institution or service provider will charge a few to perform the functions on behalf of the issuing institution. The result is an international network of ATMs that are all connected to a vast number of issuing institutions in one manner or another, enabling a user to withdraw cash or check their balance practically anywhere.

In order to provide these services across various issuing institutions, an ATM must be able to communicate with the issuing institution. As a result, when a user inserts their payment instrument into the ATM or otherwise provides their account details, the ATM will contact the issuing institution to for the balance inquiry, to get approval for a requested withdrawal, or to otherwise receive data and get authorization for functions requested by the user. Due to the strength of the infrastructure used for ATMs, this can often be performed quickly. However, because such communications are required, any interruption or delay in service may prevent the user from being able to access their account functions. In many cases, it can be detrimental to a user to be unable to inquire as to their account balance or to be unable to withdraw cash. In these instances, it may lead to the user switching to a different financial institution or utilizing an alternative payment method, which may be disadvantageous for the issuing institution as well as the user.

Thus, there is a need for a technological solution to enable account functions to be performed at an ATM that are processed by the ATM itself on behalf of an issuing institution without requiring any communication with the ATM at the time of interaction by the user.

SUMMARY

The present disclosure provides a description of systems and methods for on-behalf ATM processing via blockchain. A blockchain is used to store account information, specifically at least the current balance of an account, as an immutable and accurate record to enable an ATM to provide account services for a transaction account on behalf of the associated issuing institution. The blockchain serves as a substitute of communications with the issuing institution, enabling withdrawals, balance inquiries, and other functions to be performed even in cases where the issuing institution may be unavailable or is otherwise out of contact with the ATM. In some cases, the ATM itself may even be able to update the blockchain to enable continued usage of the payment instrument without interim contact with the issuing institution by the user or the ATM provider.

A method for on-behalf ATM processing via blockchain includes: receiving, by a receiver of an automated teller machine (ATM), a transaction identifier; receiving, by an input device interfaced with the ATM, a withdrawal amount; identifying, by the ATM, a blockchain transaction in one of a plurality of blocks comprising a blockchain, wherein the blockchain transaction includes at least the transaction identifier and a current balance; and processing, by the ATM, withdrawal of the withdrawal amount based on the current balance, where processing includes dispensing, by a dispenser interfaced with the ATM, currency equivalent to the withdrawal amount if the withdrawal amount is less than or equal to the current balance or displaying, by a display device interfaced with the ATM, a message indicating an insufficient balance if the withdrawal amount is greater than the current balance.

A system for on-behalf ATM processing via blockchain includes: a receiver of an automated teller machine (ATM) configured to receive a transaction identifier; and an input device interfaced with the ATM configured to receive a withdrawal amount, wherein the ATM is configured to identify a blockchain transaction in one of a plurality of blocks comprising a blockchain, wherein the blockchain transaction includes at least the transaction identifier and a current balance, and process withdrawal of the withdrawal amount based on the current balance, where processing includes dispensing, by a dispenser interfaced with the ATM, currency equivalent to the withdrawal amount if the withdrawal amount is less than or equal to the current balance or displaying, by a display device interfaced with the ATM, a message indicating an insufficient balance if the withdrawal amount is greater than the current balance.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
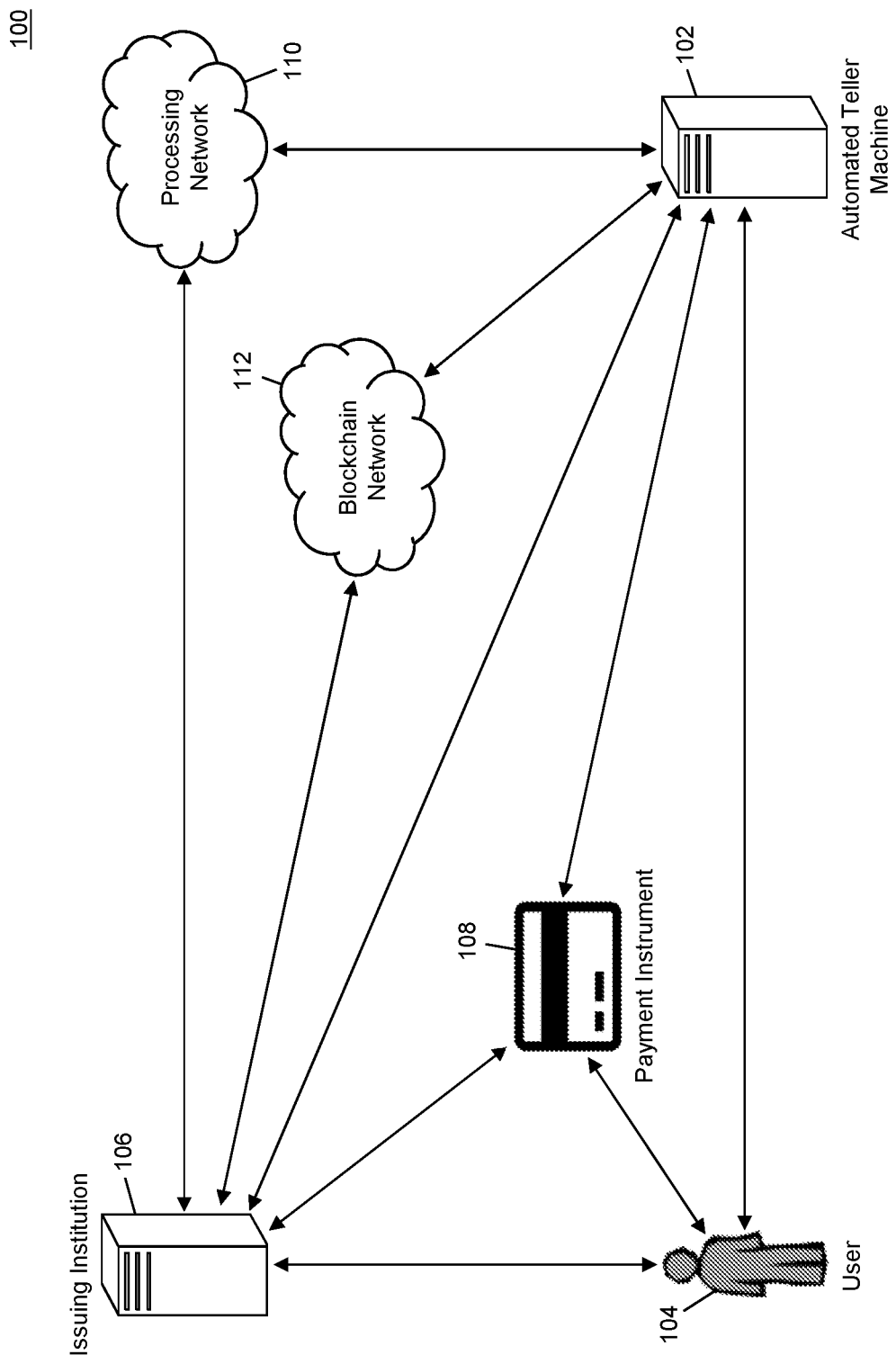
FIG. 1 is a block diagram illustrating a high level system architecture for on-behalf processing at an automated teller machine using a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Performing Automated Teller Machine Functions Using a Blockchain

FIG. 1 illustrates a system 100 for the performing of automated teller machine functions on-behalf of an issuing institution via the use of a blockchain.

The system 100 may include an automated teller machine (ATM) 102. The ATM 102, discussed in more detail below, may be an ATM that is configured to perform the traditional functions of an ATM, such as balance inquiries, cash withdrawals, deposits, cash advances, etc. that is also specially configured as discussed herein to perform ATM functions on-behalf of an issuing institution 106 as facilitated via a blockchain. In the system 100, a user 104 may have a transaction account issued thereto by an issuing institution 106. The issuing institution 106 may be a financial institution, such as an issuing bank, or other entity that is configured to issue transaction accounts to users 104 that may be used to fund payment transactions and may otherwise enable the user 104 to access traditional functions of an ATM 102.

As part of the issuing of the transaction account to the user 104, the issuing institution 106 may issue a payment instrument 108 to the user 104. The payment instrument 108 may be a debit card, check, credit card, or other instrument that may have account details encoded therein, stored therein, displayed thereon, or otherwise accessible via the payment instrument 108. The payment instrument 108 may be directly associated with the transaction account issued to the user 104 and configured such that the ATM 102 may be able to read the account details from the payment instrument 104 and receive sufficient data to enable the ATM 102 to provide the user 104 with the ATM functions for the associated transaction account. The account details may thus include, for instance, payment credentials for the transaction account, which may include a primary account number, expiration date, security code, name, address, etc.

Traditionally, the user 104 may present the payment instrument 108 to the ATM 102, and the ATM 102 would read the account details from the payment instrument 108 using a suitable method. For instance, the account details may be decoded from a magnetic strip, read from the memory of an integrated circuit, decoded from a machine-readable code displayed on the payment instrument 108. In traditional ATM functions, the ATM 102 would communicate with the issuing institution 106 directly or through a processing network 110, such as a payment network or other type of entity that provides specialized infrastructure for financial services, to request authorization or data from the issuing institution 106 for the functions. For example, the user 104 may request a cash withdrawal, where the ATM 102 would first seek authorization of the withdrawal from the issuing institution 106, where the issuing institution 106 would determine if the user's transaction account (e.g., identified via the account details read from the payment instrument 108) has sufficient balance to cover the requested amount.

In the system 100, the ATM 102 may be configured to perform functions on behalf of the issuing institution 106 without requiring communication with the issuing institution 106 during the performing of the functions via the use of a blockchain. The system 100 may include a blockchain network 112. The blockchain network 112 may be comprised of a plurality of nodes, where each node is configured to verify proposed blockchain transactions, generate new blocks for the blockchain, validate new blocks, maintain a copy of the blockchain, and perform any additional functions associated with the operation and maintenance of the blockchain. The blockchain itself may be comprised of a plurality of blocks, where each block includes at least a block header and one or more transaction data values.

A block header may include at least a timestamp, a block reference value, and a transaction reference value. The timestamp may be a time at which the block header is generated, or may refer to a time by which each of the transaction data values in the respective block may be submitted. The block reference value may be a reference to an earlier block in the blockchain, such as a reference to the block header of the most recent block (e.g., based on timestamp) added to the blockchain prior to the respective block. In some embodiments, the block reference value may be a hash value generated via hashing of the block header of the preceding block. The transaction reference value may be a reference to the transaction data values included in the respective block. In some embodiments, the transaction reference value may be the root of a Merkle tree that is generated using the transaction data values. The use of the reference values may ensure immutability of the blockchain, as any modification to a transaction data value or block header necessitates changing of the corresponding transaction reference value and the block reference value included in every subsequent block in the blockchain, which must be performed in a majority of nodes in the blockchain network 112, and prior to any new blocks being added, which may be computationally and communicatively impossible.

The transaction data values may each correspond to a blockchain transaction. The blockchain transaction may be a record that is stored in the blockchain that includes data suitable for use by the ATM 102 in performing functions on behalf of the issuing institution 106. For example, blockchain transactions may be used to store account balances for transaction accounts for use by the ATM 102 when performing balance inquiries or cash withdrawals. A blockchain transaction may include at least a transaction identifier and an account balance. The transaction identifier may be a value that is unique to at least the transaction account related to the blockchain transaction. In such instances, the transaction identifier may be, for example, a primary account number or other information that identifies the transaction account. In some cases, a transaction identifier may be unique to the blockchain transaction. In such cases, the blockchain transaction may also include an account identifier.

When the transaction account is issued, the payment instrument 108 is issued, or any management of the transaction account is otherwise performed, the issuing institution 106 may notify a node in the blockchain network 112. The node may generate a new blockchain transaction that includes a transaction identifier and the current account balance of the transaction account. The node, or a different node in communication with the initial node, may generate a new block that includes the new blockchain transaction, which may be validated by other blocks and added to the blockchain using traditional methods and systems.

The ATM 102 may be configured to store a copy of the blockchain as received from one or more nodes in the blockchain network 112, or may be otherwise in communication with one or more nodes in the blockchain network 112. As part of the reading of the account details from the payment instrument 108, the ATM 102 may also read or otherwise receive a transaction identifier from the payment instrument 108. In some cases, the account details may include the transaction identifier. The ATM 102 may identify the most recent blockchain transaction in the blockchain that includes the transaction identifier, either in its locally stored copy of the blockchain or by requesting the blockchain transaction from a node in the blockchain network 112. The ATM 102 may then utilize the current balance that is stored in the blockchain transaction when providing ATM functions to the user 104. For instance, if the user 104 requests a balance inquiry, the ATM 102 may display the current balance as stored in the blockchain transaction to the user 104. In another example, if the user requests a cash withdrawal, the ATM 102 will determine if the user's transaction account has sufficient balance to cover the requested amount using the current balance stored in the blockchain transaction, and will dispense the cash or display an error message accordingly.

Following the performance of an ATM function, the blockchain may be updated to reflect the new current balance of the transaction account, if applicable. For instance, if a balance inquiry is performed, the blockchain may not need to be updated. In some embodiments, the ATM 102 may notify the issuing institution 106 following the ATM transaction, at which time the issuing institution 106 may communicate with the blockchain network 112 to update the blockchain to generate and store a new blockchain transaction having an updated current balance for the transaction account. In other embodiments, the ATM 102 may be configured to perform the update to the blockchain directly. For instance, the ATM 102 may electronically transmit a data message to a node in the blockchain network that includes the transaction identifier and an updated current balance (e.g., based on the withdrawal amount and any applied fees). The node may receive the data and may generate a new blockchain transaction that is included in a newly generated block that is validated and added to the blockchain. The user 104 may then continue using the payment instrument 108 at the ATM 102 or other device, where the updated current balance may be used for additional on-behalf processing. The ATM 102 may also be configured to notify the issuing institution 106 of the functions performed at the ATM 102, which, in some cases, may be performed via the traditional functions of the ATM 102. For example, for a cash withdrawal, the ATM 102 may provide the cash to the user 104 based on the blockchain data, but may still submit a transaction message to the issuing institution 106 through a processing network 110 for the withdrawal using standard processes, such that the issuing institution 106 may update the transaction account accordingly using legacy systems.

In some embodiments, the blockchain may utilize cryptographic key pairs and digital signatures to prevent fraud or other misuse of balances and other data. In such embodiments, each payment instrument 108 may be associated with a cryptographic key pair comprised of a private key and a public key, where the cryptographic key pair may be generated using any suitable key generation algorithm. The cryptographic key pair may be used in the manner of a traditional blockchain wallet, where each blockchain transaction may include a blockchain address generated using the public key, and where the private key may be used to generate a digital signature associated therewith that, when verified, proves ownership of the private key and thereby provides access to the data in the blockchain transaction.

In an example, the cryptographic key pair may be generated by the payment instrument 108 or issuing institution 106, and the public key used to generate a blockchain address that is included in the first blockchain transaction for the payment instrument 108. When the payment instrument 108 is used for a transaction at the ATM 102, the private key is used to generate a digital signature. In some embodiments, the issuing institution 106 may possess the private key and may generate a digital signature that is provisioned to the payment instrument 108 and then conveyed to the ATM 102. In other embodiments, the payment instrument 108 may possess the private key and may generate the digital signature and convey it along with the transaction identifier to the ATM 102. In yet another embodiment, the payment instrument 108 may provide the private key to the ATM 102 with the transaction identifier, where the ATM 102 may generate the digital signature. The ATM 102 may verify the digital signature using the public key (e.g., also conveyed by the payment instrument 108, previously provided to the ATM 102, received from the issuing institution 106, stored in the blockchain, etc.) or may request verification of the digital signature from the blockchain network 112. If the digital signature is validated and matches the blockchain transaction that includes the transaction identifier (e.g., determined by the blockchain address being generated with the public key used in successful validation of the digital signature), then the current balance included in the blockchain transaction may be used. If the digital signature validation fails, then the transaction may be stopped to prevent misuse or fraud.

In such embodiments, once one or more ATM functions have been performed, the blockchain may be updated through use of the digital signature and public key. For instance, the ATM 102 or issuing institution 106 may electronically transmit the digital signature and a new blockchain address (e.g., generated via the public key, or may provide the public key for generation of the new blockchain address) to the node in the blockchain network 112. The blockchain node may validate the digital signature and may then generate and insert a blockchain transaction that includes the new blockchain address and an updated account balance. The cryptographic key pair may thus be used to increase the security of the data stored in the blockchain by preventing unauthorized use of an account balance.

In some embodiments, the payment instrument 108 may be configured to store a transaction history of transactions performed using the payment instrument 108. In such embodiments, the transaction history may be provided to the ATM 102 for use in addition to the current balance obtained via the blockchain. The transaction history may be beneficial in instances where updates to the blockchain may be delayed or may otherwise be unavailable to the ATM 102. In such cases, the ATM 102 may receive the transaction history from the payment instrument 108 with the transaction identifier. The ATM 102 may, based on the timestamp of the block that includes the most recent blockchain transaction for the transaction account, determine if additional transactions have been performed since the last update to the blockchain. If additional transactions have been performed, the ATM 102 may take into account any reductions to the current balance of the transaction account since the last update in the blockchain using the transaction history. For example, the current balance in the blockchain may be $100, but the transaction history in the payment instrument 108 may show a recent withdrawal from a different ATM for $50 that occurred five minutes after the last update to the blockchain. If the user 104 is attempting to withdraw more than $50, the ATM 102 may prevent the transaction to ensure that the user 104 does not overdraw their account. In such embodiments, the transaction history may include at least transaction times and/or dates and transaction amounts for the transactions conducted using the payment instrument 108, where the transactions may include ATM transactions and may also include additional transactions, such as merchant transactions conducted at a point of sale. In these embodiments, the ATM 102 may be configured to electronically transmit the withdrawal amount or other data associated with functions performed at the ATM 102 by the user 104 for use by the payment instrument 108 in updating the transaction history for use in subsequent transactions.

The methods and systems discussed herein enable an ATM 102 that is specially configured to be able to perform ATM functions on behalf of an issuing institution 106 without requiring participation by the issuing institution 106 during the transaction via the use of a blockchain. The blockchain provides for an immutable and reliable record that can be used to prevent fraud or other misuse and enable a user 104 to get a cash withdrawal or perform other functions at the ATM 102 and have the transaction finished without any outside communication being necessary by the ATM 102, resulting in faster and more reliable transactions, even in cases where service disruptions may be occurring.

Automated Teller Machine

Figure 2:
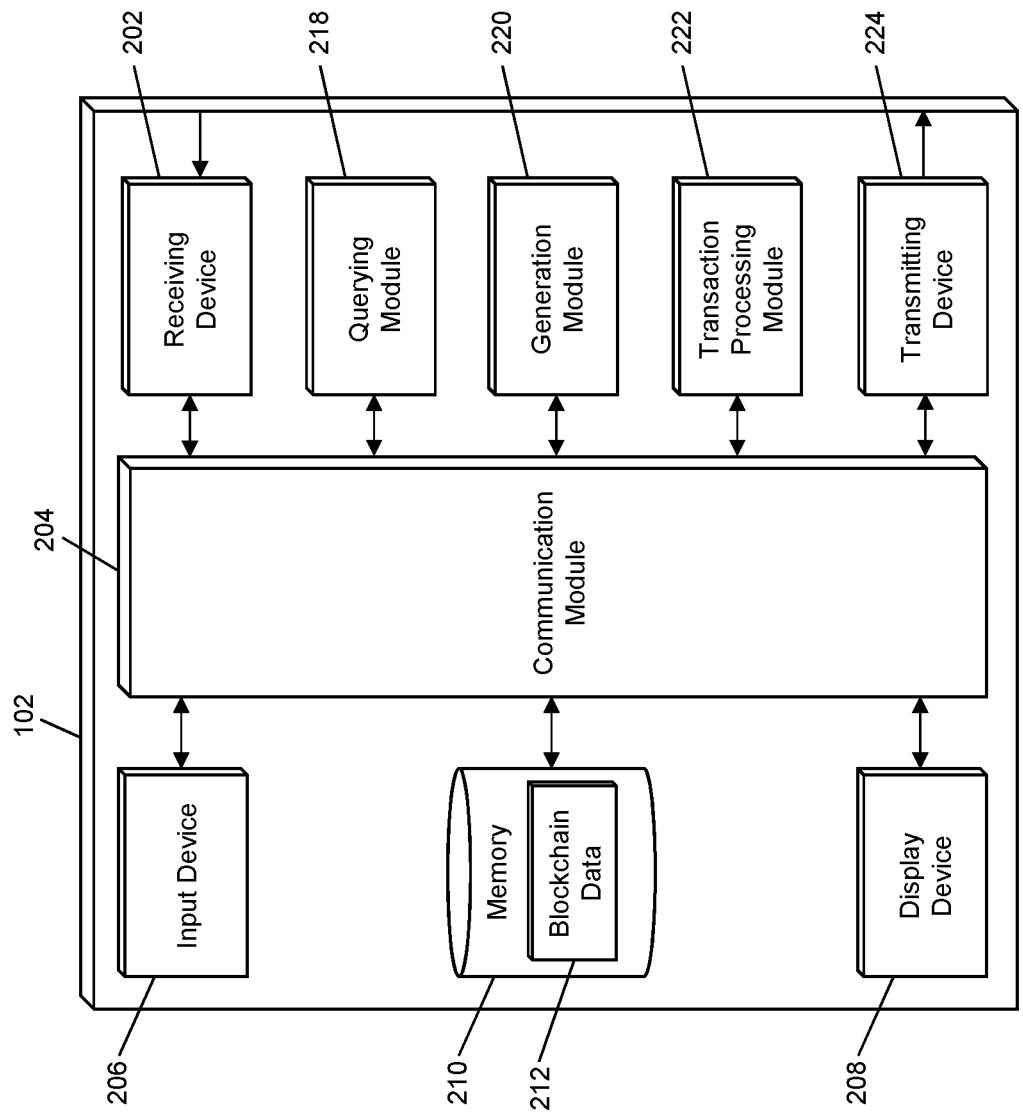
FIG. 2 is a block diagram illustrating the automated teller machine of the system of FIG. 1 for on-behalf processing using a blockchain in accordance with exemplary embodiments.

FIG. 2 illustrates an embodiment of the automated teller machine (ATM) 102 in the system 100. It will be apparent to persons having skill in the relevant art that the embodiment of the ATM 102 illustrated in FIG. 2 is provided as illustration only and may not be exhaustive to all possible configurations of the ATM 102 suitable for performing the functions as discussed herein. For example, the computer system 500 illustrated in FIG. 5 and discussed in more detail below may be a suitable configuration of the ATM 102.

The ATM 102 may include a receiving device 202. The receiving device 202 may be configured to receive data over one or more networks via one or more network protocols. In some instances, the receiving device 202 may be configured to receive data from payment instruments 108, blockchain networks 112 and nodes thereof, processing networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment instruments 108, which may be superimposed or otherwise encoded with transaction identifiers, and, in some cases, may also include transaction histories, public keys, digital signatures, private keys, or other data as discussed herein. The receiving device 202 may also be configured to receive data signals electronically transmitted by nodes in a blockchain network 112, which may be superimposed or otherwise encoded with blockchain data. The receiving device 202 may also be configured to receive data signals electronically transmitted by processing networks 110, which may be superimposed or otherwise encoded with transaction messages or other data used in the performing and processing of ATM transactions.

The ATM 102 may also include a communication module 204. The communication module 204 may be configured to transmit data between modules, engines, databases, memories, and other components of the ATM 102 for use in performing the functions discussed herein. The communication module 204 may be comprised of one or more communication types and utilizes various communication methods for communications within a computing device. For example, the communication module 204 may be comprised of a bus, contact pin connectors, wires, etc. In some embodiments, the communication module 204 may also be configured to communicate between internal components of the ATM 102 and external components of the ATM 102, such as externally connected databases, display devices, input devices, etc. The ATM 102 may also include a processing device. The processing device may be configured to perform the functions of the ATM 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The ATM 102 may also include or be otherwise interfaced with one or more input devices 206. The input devices 206 may be internal to the ATM 102 or external to the ATM 102 and connected thereto via one or more connections (e.g., wired or wireless) for the transmission of data to and/or from. The input devices 206 may be configured to receive input from a user of the ATM 102, such as the user 104, which may be provided to another module or engine of the ATM 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive instructions input by the user 104, such as selecting a function of the ATM 102, providing a withdrawal amount, etc. In some cases, the input device 206 may be configured to read data encoded in, displayed on, or otherwise made available by the payment instrument 108, such as transaction identifiers, transaction histories, digital signatures, public keys, etc.

The ATM 102 may also include or be otherwise interfaced with a display device 208. The display device 208 may be internal to the ATM 102 or external to the ATM 102 and connected thereto via one or more connections (e.g., wired or wireless) for the transmission of data to and/or from. The display device 208 may be configured to display data to a user of the ATM 102, such as the user 104. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the ATM 102 may include multiple display devices 208. The display device 208 may be configured to, for example, display selection lists of ATM functions, prompts to the user 104, messages or notifications, etc.

The ATM 102 may also include a memory 210. The memory 210 may be configured to store data for use by the ATM 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the ATM 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store blockchain data 212. The blockchain data 212 may, in some instances, be a copy of the entire blockchain associated with the blockchain network 112, or, in other instances, may only be a portion of the blockchain. For instance, the blockchain data 212 may include only blockchain transactions that have been received by the ATM 102 upon request or are related to ATM transactions performed at the ATM 102. The memory 210 may also be configured to store any additional data used for the functions discussed herein, such as public keys associated with payment instruments 108 used at the ATM 102, digital signature generation and validation algorithms, blockchain address generation algorithms, etc.

The ATM 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the ATM 102 as necessary. The querying module 218 may, for example, execute a query on the memory 210 to identify a blockchain transaction that includes a transaction identifier received or read from a payment instrument 108.

The ATM 102 may also include a generation module 220. The generation module 220 may be configured to generate data for use by the ATM 102 in performing the functions discussed herein. The generation module 220 may receive instructions as input, may generate data based on the instructions, and may output the generated data to one or more modules of the ATM 102. For example, the generation module 220 may be configured to generate notifications and other data messages for display on the display device 208, such as to inform the user 104 of an account balance for balance inquiries, notify the user 104 if a withdrawal cannot be performed (e.g., due to insufficient balance), etc. The generation module 220 may also be configured to generate instructions for use by devices interfaced with the ATM 102. For example, the generation module 220 may be configured to generate instructions that are provided to a dispenser that is interfaced with the ATM 102 internally or externally for the dispensing of cash to the user 104 for a cash withdrawal.

The ATM 102 may also include a transaction processing module 222. The transaction processing module 222 may be configured to perform functions associated with the processing of transactions as part of the ATM 102 as discussed herein. For example, the transaction processing module 222 may be configured to perform functions associated with balance inquiries, cash withdrawals, cash deposits, check deposits, etc., such as the reading and identification of cash amounts, of decoding data read from checks, the calculation of fees and applicability to various ATM functions, etc.

The ATM 102 may also include a transmitting device 224. The transmitting device 224 may be configured to transmit data over one or more networks via one or more network protocols. In some instances, the transmitting device 224 may be configured to transmit data to issuing institutions 106, payment instruments 108, processing networks 110, blockchain networks 112 and nodes thereof, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to payment instruments 108, which may be superimposed or otherwise encoded with data requests, such as to request transaction identifiers, transaction histories, digital signatures, public keys, etc. The transmitting device 224 may also be configured to electronically transmit data signals to payment instruments 108 that are superimposed or otherwise encoded with transaction data for use by the payment instrument 108 in updating a transaction history stored therein. The transmitting device 224 may also be configured to electronically transmit data signals to processing networks 110, which may be transmitted using specialized infrastructure associated therewith, which may be superimposed or otherwise encoded with transaction messages and other data associated with traditional ATM functions and the processing of ATM transactions. In some instances, the transmitting device 224 may be configured to electronically transmit data signals directly to issuing institutions 106 for notifications of ATM transactions or other data as discussed herein. In other instances, such transmissions may be performed via the processing network 110. The transmitting device 224 may be further configured to electronically transmit data signals to nodes in a blockchain network 112, which may be superimposed or otherwise encoded with requests for blockchain data or data for use in new blockchain transactions such as transaction identifiers, updated balances, digital signatures, blockchain addresses, public keys, etc.

Process for Automated Teller Machine Withdrawals Using Blockchain

Figure 3:
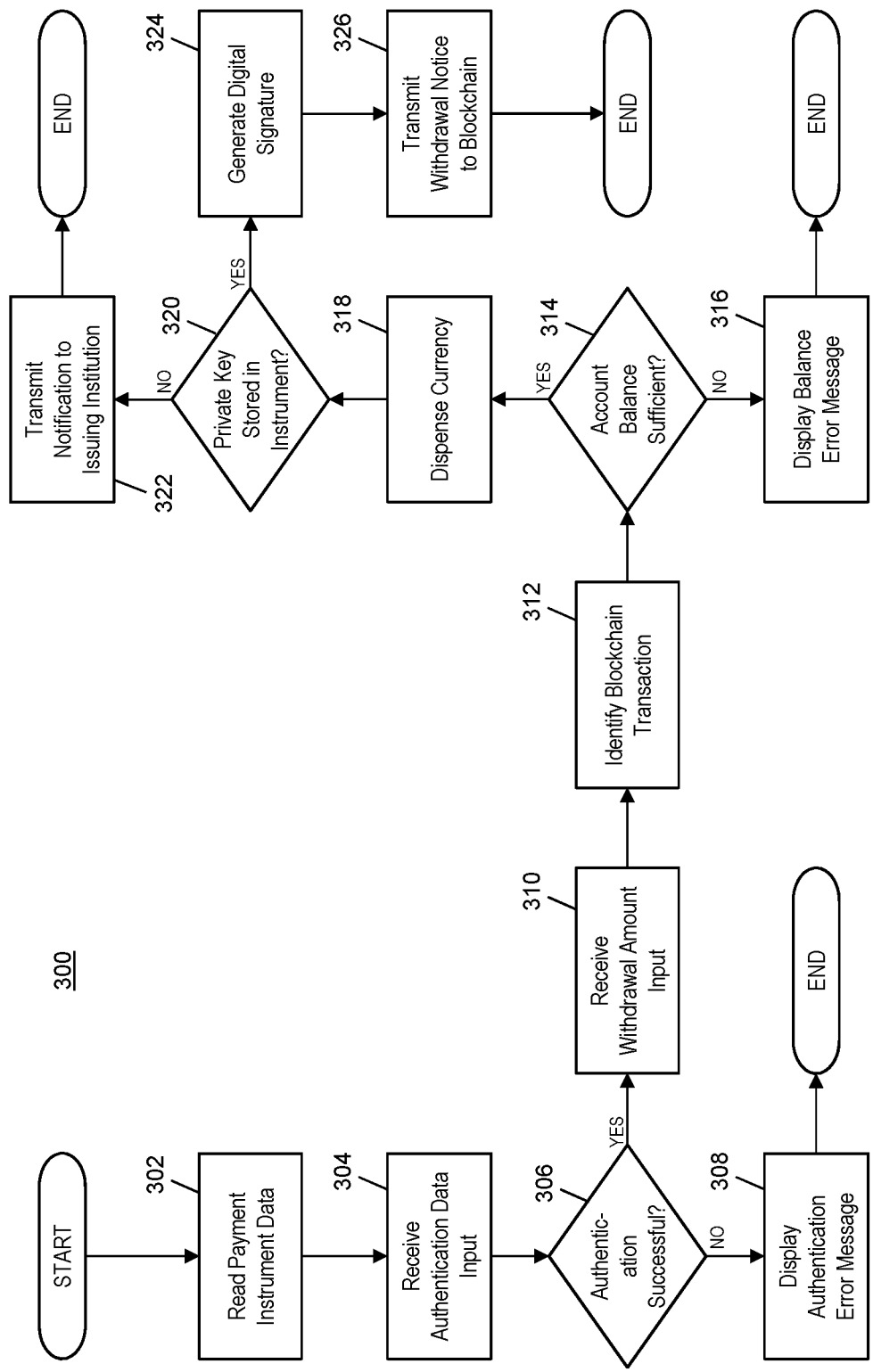
FIG. 3 is a flow diagram illustrating a process for the processing of automated teller machine functions on-behalf of an issuing institution by the automated teller machine of FIG. 2 in accordance with exemplary embodiments.

FIG. 3 illustrates an example process executed by the automated teller machine (ATM) 102 in the system 100 in FIG. 1 for processing a cash withdrawal on behalf of the issuing institution 106 without requiring participation thereof as facilitated via the blockchain network 112.

In step 302, the input device 206 or receiving device 202 of the ATM 102 may read data from the payment instrument 108 presented by the user 104, where the data may include at least a transaction identifier and authentication data. The authentication data may include, for instance, a personal identification number (PIN), biometric data, or other data that may be used in authentication associated with a payment instrument 108. In some cases, the data read from the payment instrument 108 may also include a transaction history, public key, blockchain address, digital signature, and/or private key. In step 304, the input device 206 may receive input from the user 104 of authentication data. For instance, the user 104 may type a PIN or password into a keyboard of the ATM 102 or may supply a fingerprint or other biometric data to a suitable type of input device.

In step 306, the ATM 102 may determine if authentication is successful. The determination may be based on a comparison of the authentication data supplied by the user 104 as compared to authentication data received from the payment instrument 108. If the authentication is unsuccessful (e.g., the data provided by the user 104 doesn't match the data stored in the payment instrument 108), then, in step 308, the display device 208 interfaced with the ATM 102 may display an error message to the user 104 informing the user that authentication failed. In some cases, the user 104 may be presented with a prompt to enable the user 104 to request additional attempts at authentication. In such cases, the process 300 may return to step 304 upon such a selection.

If the authentication of the user 104 is successful, then, in step 310, the input device 206 interfaced with the ATM 102 may receive input by the user 104 specifying that a cash withdrawal be performed and supplying a requested a withdrawal amount. In step 312, the querying module 218 of the ATM 102 may execute a query on the memory 210 of the ATM 102 to identify, in the blockchain data 212 stored therein, a blockchain transaction that includes the transaction identifier read from the payment instrument 108. In step 314, the ATM 102 may determine if the transaction account associated with the payment instrument 108 has a sufficient balance to cover the requested withdrawal amount, which may be based on the current balance that's included in the identified blockchain transaction. In cases where transaction history is read from the payment instrument 108, the ATM 102 may consider an updated current balance based thereon when determining the sufficiency of the account balance. In some embodiments, step 314 may also include a validation of a digital signature read from the payment instrument 108. If the ATM 102 determines that the balance is insufficient (e.g., or the validation is unsuccessful, if applicable), then, in step 316, the display device 208 interfaced with the ATM 102 may display an error message to the user 104 informing the user 104 that they have an insufficient balance (e.g., or that validation failed, as applicable).

If the transaction account has a sufficient balance, then, in step 318, the transmitting device 224 of the ATM 102 may electronically transmit an instruction to a dispenser interfaced with the ATM 102 to dispense the requested withdrawal amount of currency to the user 104. In embodiments where transaction history may be stored in the payment instrument 108, the transmitting device 224 of the ATM 102 may electronically transmit a data message to the payment instrument 108 including at least the withdrawal amount to enable the payment instrument 108 to update its transaction history accordingly.

In step 320, the ATM 102 may determine if the payment instrument 108 includes a private key used for updating the blockchain. In some embodiments, such a determination may be based on the results of step 302 based on what was read from the payment instrument 108. In other embodiments, the ATM 102 may communicate with the payment instrument 108 following the withdrawal to make such a determination. If there is no private key stored in the payment instrument 108, then, in step 322, the transmitting device 224 of the ATM 102 may electronically transmit a notification to the issuing institution 106 associated with the transaction account to notify the issuing institution 106 of the withdrawal. In some cases, the notification may be transmitted via the processing network 110, and may be represented as a traditional ATM function for use by the issuing institution 106 in processing the withdrawal internally.

If the payment instrument 108 does store a private key, then, in step 324, a digital signature may be generated. In some embodiments, the private key may be provided to the ATM 102 by the payment instrument 108 (e.g., in step 302 or step 320), and the generation module 220 of the ATM 102 may generate a digital signature based thereon. In other embodiments, the payment instrument 108 may generate the digital signature, which may be provided to the ATM 102 in step 302 or as part of step 320 or 324. In some instances, the private key may not be stored within the payment instrument 108, but the process 300 may still proceed to step 324 if the payment instrument 108 has a digital signature available. For instance, the issuing institution 106 may store the private key but may provision one or more digital signatures to the payment instrument 108 for use in the process 300. Once a digital signature is generated or otherwise received at the ATM 102, then, in step 326, the transmitting device 224 of the ATM 102 may electronically transmit a notification to a node in the blockchain network 112 that includes at least the digital signature, transaction identifier, and withdrawal amount for use in updating the blockchain. In some cases, the transmission may also include a blockchain address or public key corresponding to the payment instrument's private key. The node may then update the blockchain accordingly, adding a new blockchain transaction that updates the balance of the transaction account to reflect the withdrawal.

Figure 4:
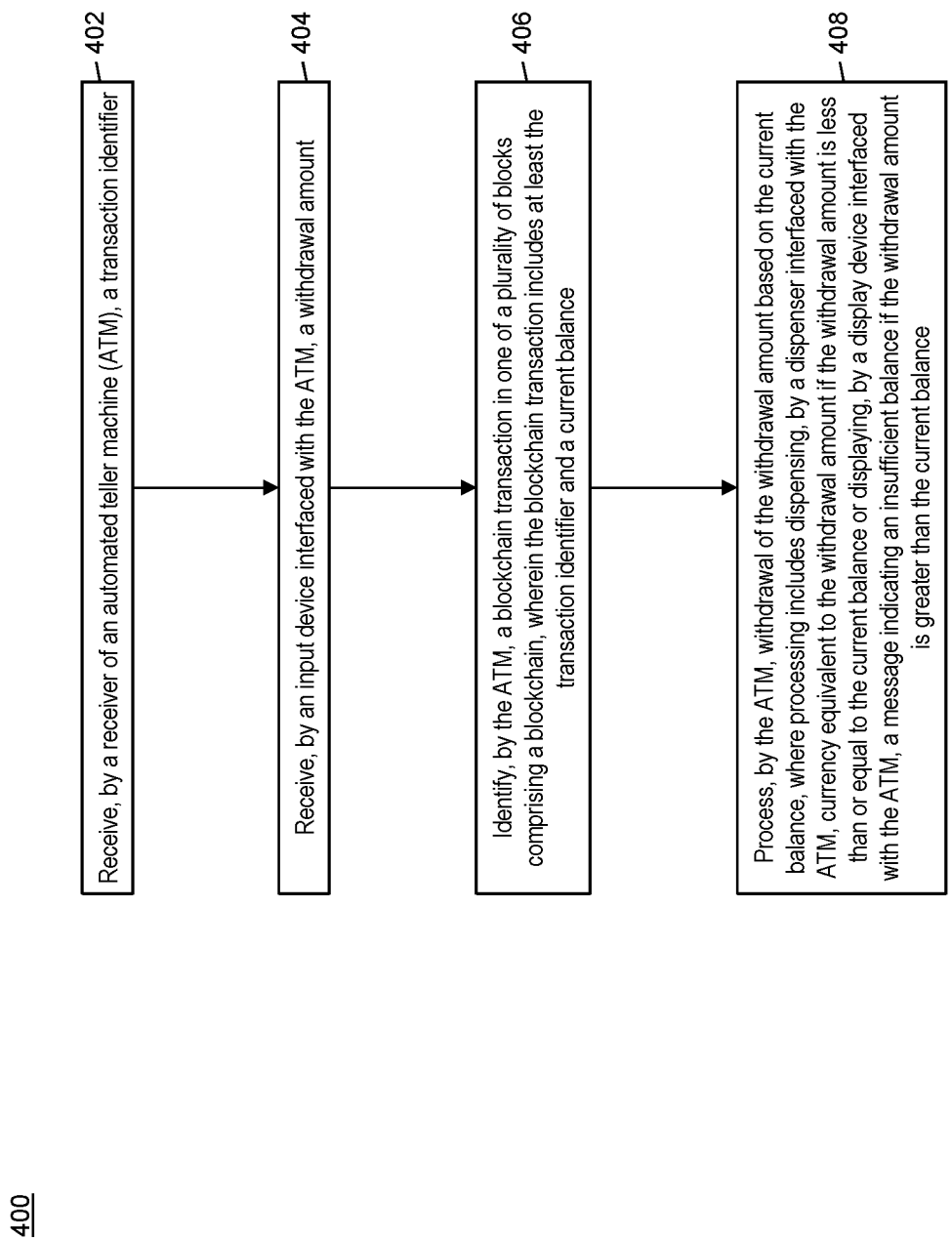
FIG. 4 is a flow chart illustrating an exemplary method for on-behalf automated teller machine processing via blockchain in accordance with exemplary embodiments.

Exemplary Method for On-Behalf Automated Teller Machine Processing Via Blockchain FIG. 4 illustrates a method 400 for the processing of a cash withdrawal at an automated teller machine (ATM) on behalf of an issuing institution facilitated through the use of a blockchain.

In step 402, a transaction identifier may be received by a receiver (e.g., the receiving device 202 or input device 206) of an ATM (e.g., the ATM 102). In step 404, a withdrawal amount may be received by an input device (e.g., an input device 206) interfaced with the ATM. In step 406, a blockchain transaction may be identified by the ATM in one of a plurality of blocks comprising a blockchain, wherein the blockchain transaction includes at least the transaction identifier and a current balance. In step 408, withdrawal of the withdrawal amount may be processed by the ATM based on the current balance, where processing includes dispensing, by a dispenser interfaced with the ATM, currency equivalent to the withdrawal amount if the withdrawal amount is less than or equal to the current balance or displaying, by a display device (e.g., a display device 208) interfaced with the ATM, a message indicating an insufficient balance if the withdrawal amount is greater than the current balance.

In one embodiment, the method 400 may further include storing, in a memory (e.g., the memory 210) of the ATM, the plurality of blocks comprising the blockchain, wherein identifying a blockchain transaction includes executing a query (e.g., by the querying module 218) on the memory of the ATM to identify, in the plurality of blocks stored in the memory, the blockchain transaction based on the transaction identifier. In some embodiments, identifying the blockchain transaction may include electronically transmitting, by a transmitter (e.g., the transmitting device 224) of the ATM, a request to a node in a blockchain network (e.g., the blockchain network 112), the request including at least the transaction identifier, and receiving, by the receiver of the ATM, the blockchain transaction.

In one embodiment, the method 400 may also include receiving, by the receiver of the ATM, a digital signature; and electronically transmitting, by a transmitter of the ATM, a new transaction to a node in a blockchain network, wherein the new transaction includes at least the transaction identifier, digital signature, and withdrawal amount. In some embodiments, the method 400 may further include: receiving, by the receiver of the ATM, a private key of a cryptographic key pair; generating, by the ATM, a digital signature using the private key; and electronically transmitting, by a transmitter of the ATM, a new transaction to a node in a blockchain network, wherein the new transaction includes at least the transaction identifier, digital signature, and withdrawal amount. In one embodiment, the method 400 may also include electronically transmitting, by a transmitter of the ATM, at least the transaction identifier and withdrawal amount to an issuing institution (e.g., the issuing institution 106) associated with the transaction identifier.

In some embodiments, the method 400 may further include: receiving, by the receiver of the ATM, historical transaction data from a payment instrument (e.g., the payment instrument 108); and modifying, by the ATM, the current balance based on the historical transaction data before processing withdrawal of the withdrawal amount. In a further embodiment, the transaction identifier may be received from the payment instrument. In another further embodiment, the method 400 may even further include electronically transmitting, by a transmitter of the ATM, the withdrawal amount to the payment instrument if the withdrawal amount is less than or equal to the current balance. In one embodiment, the transaction identifier may be received from a payment instrument.

Computer System Architecture

Figure 5:
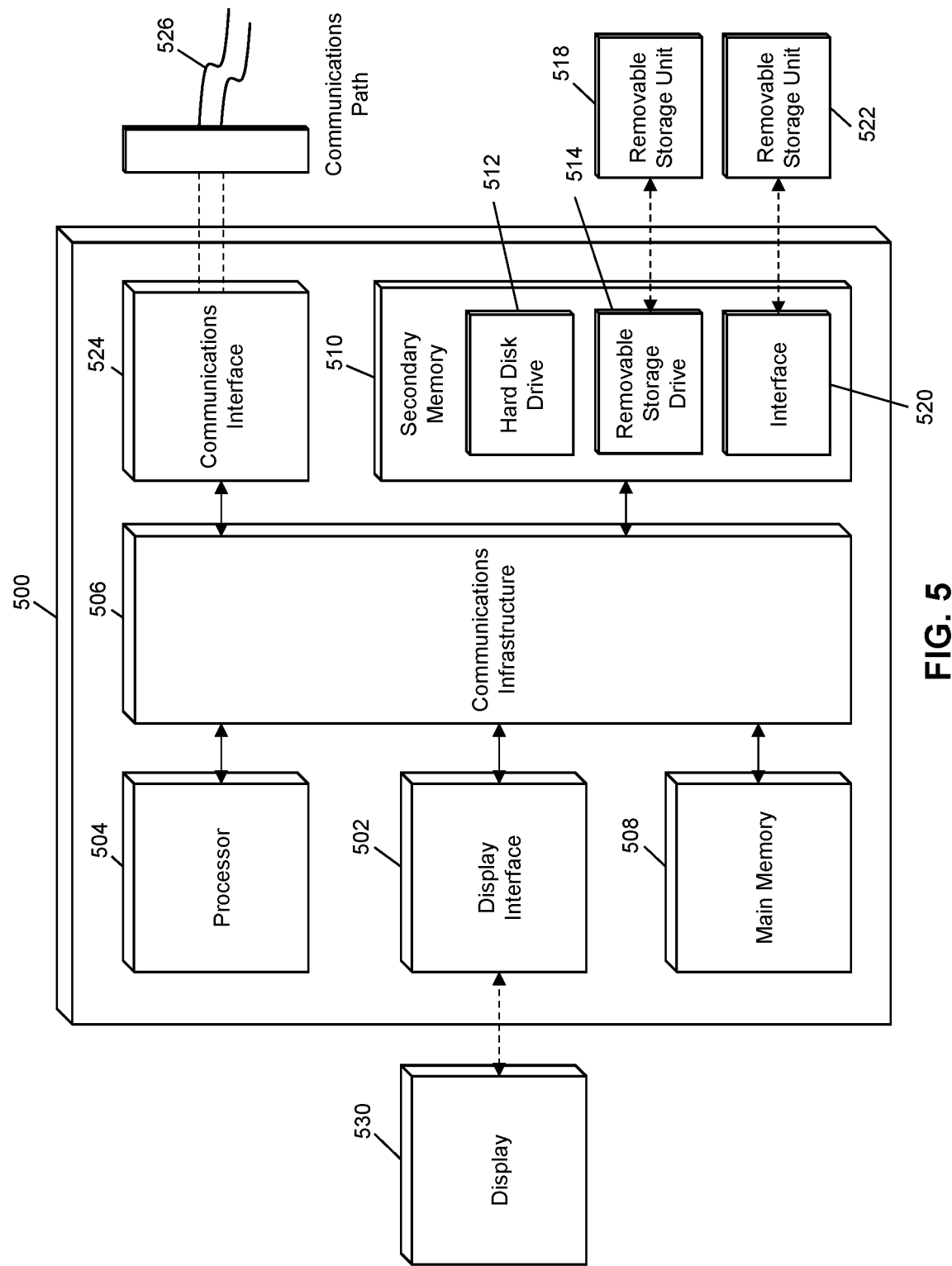
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the ATM 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for on-behalf ATM processing via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for on-behalf ATM processing via blockchain, comprising:
   receiving, by a receiver of an automated teller machine (ATM), from a payment instrument issued by an issuing institution, a transaction identifier and transaction history of transactions performed using the payment instrument;
   receiving, by an input device interfaced with the ATM, a withdrawal amount;
   identifying, by the ATM, a blockchain transaction in one of a plurality of blocks comprising a blockchain, wherein the blockchain transaction includes at least the transaction identifier and a current balance;
   determining, by the ATM, whether additional transactions have been performed since a most recent update to the blockchain based on the transaction history received from the payment instrument;
   in response to determining that addition transactions have been performed since the most recent update to the blockchain, modifying the current balance included in the identified blockchain transaction based on any reductions to the current balance since the most recent update using the transaction history received from the payment instrument;
   processing, by the ATM, withdrawal of the withdrawal amount based on the modified current balance, where processing includes dispensing, by a dispenser interfaced with the ATM, currency equivalent to the withdrawal amount if the withdrawal amount is less than or equal to the updated current balance or displaying, by a display device interfaced with the ATM, a message indicating an insufficient balance if the withdrawal amount is greater than the modified current balance;
   identifying, by the ATM, a digital signature; and
   electronically transmitting, by a transmitter of the ATM, a new transaction to a node in a blockchain network, wherein the new transaction includes at least the transaction identifier, digital signature, and an updated balance.

2. The method of claim 1, further comprising:
   storing, in a memory of the ATM, the plurality of blocks comprising the blockchain, wherein
   identifying a blockchain transaction includes executing a query on the memory of the ATM to identify, in the plurality of blocks stored in the memory, the blockchain transaction based on the transaction identifier.

3. The method of claim 1, wherein identifying the blockchain transaction includes electronically transmitting, by a transmitter of the ATM, a request to a node in a blockchain network, the request including at least the transaction identifier, and receiving, by the receiver of the ATM, the blockchain transaction.

4. The method of claim 1, further comprising:
   receiving, by the receiver of the ATM, a digital signature; and
   electronically transmitting, by a transmitter of the ATM, a new transaction to a node in a blockchain network, wherein the new transaction includes at least the transaction identifier, digital signature, and withdrawal amount.

5. The method of claim 1, further comprising:
   receiving, by the receiver of the ATM, a private key of a cryptographic key pair, wherein identifying the digital signature includes generating, by the ATM, the digital signature using the private key, and the updated balance is based on the modified current balance and the withdrawal amount.

6. The method of claim 1, further comprising:
electronically transmitting, by a transmitter of the ATM, at least the transaction identifier and withdrawal amount to an issuing institution associated with the transaction identifier.

7. The method of claim 1, further comprising:
electronically transmitting, by a transmitter of the ATM, the withdrawal amount to the payment instrument if the withdrawal amount is less than or equal to the current balance.

8. A system for on-behalf ATM processing via blockchain, comprising:
a receiver of an automated teller machine (ATM) configured to receive, from a payment instrument issued by an issuing institution, a transaction identifier and transaction history of transactions performed using the payment instrument;
an input device interfaced with the ATM configured to receive a withdrawal amount; and
a transmitter of the ATM, wherein
the ATM is configured to
identify a blockchain transaction in one of a plurality of blocks comprising a blockchain, wherein the blockchain transaction includes at least the transaction identifier and a current balance,
determine whether additional transactions have been performed since a most recent update to the blockchain based on the transaction history received from the payment instrument
in response to determining that addition transactions have been performed since the most recent update to the blockchain, modify the current balance included in the identified blockchain transaction based on any reductions to the current balance since the most recent update using the transaction history received from the payment instrument;
process withdrawal of the withdrawal amount based on the current balance, where processing includes dispensing, by a dispenser interfaced with the ATM, currency equivalent to the withdrawal amount if the withdrawal amount is less than or equal to the modified current balance or displaying, by a display device interfaced with the ATM, a message indicating an insufficient balance if the withdrawal amount is greater than the modified current balance, and
identify a digital signature; and
the transmitter of the ATM is configured to transmit a new transaction to a node in a blockchain network, wherein the new transaction includes at least the transaction identifier, digital signature, and an updated balance.

9. The system of claim 8, further comprising:
a memory of the ATM configured to store the plurality of blocks comprising the blockchain, wherein
identifying a blockchain transaction includes executing a query on the memory of the ATM to identify, in the plurality of blocks stored in the memory, the blockchain transaction based on the transaction identifier.

10. The system of claim 8, wherein identifying the blockchain transaction includes electronically transmitting, by a transmitter of the ATM, a request to a node in a blockchain network, the request including at least the transaction identifier, and receiving, by the receiver of the ATM, the blockchain transaction.

11. The system of claim 8, further comprising:
a transmitter of the ATM, wherein
the receiver of the ATM is further configured to receive a digital signature, and
the transmitter of the ATM is configured to electronically transmit a new transaction to a node in a blockchain network, wherein the new transaction includes at least the transaction identifier, digital signature, and withdrawal amount.

12. The system of claim 8,
wherein
the receiver of the ATM is further configured to receive a private key of a cryptographic key pair,
identifying the digital signature includes generating the digital signature using the private key, and
the updated balance is based on the modified current balance and the withdrawal amount.

13. The system of claim 8, further comprising:
a transmitter of the ATM configured to electronically transmit at least the transaction identifier and withdrawal amount to an issuing institution associated with the transaction identifier.

14. The system of claim 8, further comprising:
a transmitter of the ATM configured to electronically transmit the withdrawal amount to the payment instrument if the withdrawal amount is less than or equal to the current balance.

* * * * *